United States Patent [19]

Leonaggeo, Jr.

[11] 4,291,646
[45] *Sep. 29, 1981

[54] WHIRLPOOL THERAPY FACILITY AND METHOD OF TREATMENT

[76] Inventor: Angelo Leonaggeo, Jr., Seven High St., Bedford Hills, N.Y. 10507

[*] Notice: The portion of the term of this patent subsequent to Jan. 15, 1997, has been disclaimed.

[21] Appl. No.: 70,880

[22] Filed: Aug. 29, 1979

Related U.S. Application Data

[63] Continuation of Ser. No. 849,256, Nov. 7, 1977, Pat. No. 4,183,329.

[51] Int. Cl.³ .................... A01K 15/02; A61D 11/00
[52] U.S. Cl. ..................................... 119/29; 119/158
[58] Field of Search ............... 119/29, 158; 4/172.16; 272/26

[56] References Cited

U.S. PATENT DOCUMENTS

| | | | |
|---|---|---|---|
| 716,574 | 12/1902 | Nimmo | 119/158 X |
| 983,820 | 2/1911 | Goff | 119/158 |
| 2,611,341 | 9/1952 | Paris | 119/158 |
| 3,060,892 | 10/1962 | Schantz | 119/158 |
| 3,691,995 | 9/1972 | Little | 119/158 X |
| 4,165,714 | 8/1979 | Weissman et al. | 119/158 |
| 4,183,329 | 1/1980 | Leonaggeo, Jr. | 119/158 |

Primary Examiner—Hugh R. Chamblee
Attorney, Agent, or Firm—Brumbaugh, Graves, Donohue & Raymond

[57] ABSTRACT

A whirlpool therapy facility especially useful for treatment of racehorses is disclosed. The facility includes a heated pool of water contained within an elongated channel shaped tub having upstanding substantially parallel sidewalls and a pair of opposed laterally extending inclined ramps for ingress to and egress from the pool. A plurality of air induction type hyrdrojet water nozzles is carried by each of the sidewalls in an inverted substantially U-shaped pattern corresponding generally to the outline of the torso and legs of a horse. Turbulence in the pool is generated by jets of intermixed water and air injected under pressure through the nozzles at selected body portions of the horse to massage disfunctional or injured muscles and joints. The tub is preferably large enough to accommodate two horses in tandem for simultaneous therapy treatments.

3 Claims, 5 Drawing Figures

WHIRLPOOL THERAPY FACILITY AND METHOD OF TREATMENT

This is a continuation, of application Ser. No. 849,256, filed Nov. 7, 1977, now U.S. Pat. No. 4,183,329.

BACKGROUND OF THE INVENTION

Soreness in racehorses has become a serious problem not only to horse racing as a business, but also and more importantly, to horse racing as a sport. The long racing season, and particularly the hard racing surfaces experienced at some colder temperatures and climates, contribute to the increasing soreness and lameness of the racehorses. With the increasing national interest and participation in the sport in recent years, horseman and racetrack administrators have come to recognize a greater burden and responsibility to provide sound horses for quality racing.

The news and television media, have been attempting to focus public attention upon the racing of sore or lame horses as inhumane and as per se bad for the sport. Moreover, it is well-known that race secretaries have experienced increasing difficulty in locating a sufficient number of sound horses to fill their daily needs, particularly in view of the greater number of races being run each year.

It has long been known that human athletes respond to proper water thereapy as a form of treatment for muscular and joint related disorders and soreness resulting from training for and participation in athletic events. Similarly, the use of water therapy in general to relieve the soreness suffered by racehorses is well-known to horsemen. Heretofore, when a horse becomes lame or sore, cold water from an ordinary garden hose has simply been applied manually to the horse's legs. Alternatively, a horse with a soreness in its ankles has been treated heretofore by forcing it to stand for a period of time with each leg extending into a bucket or "boot" containing cold water. Trainers and veterinarians in isolated instances have been known to construct crude whirlpooling tanks to provide at least minimum water therapy to relieve soreness in the lower leg areas. For example, one such whirlpool tank is disclosed in U.S. Pat. No. 3,060,892 to R. J. Schantz. Units of this type have been utilized at racetracks and have not been accorded wide success. In general they consist of a four walled structure similar to but smaller than the usual horse stall, one wall of which can be opened to permit the horse to enter. The wall is then closed and sealed and water is introduced to fill the tank to an appropriate level around the horse. One nozzle for each leg is located in opposing sidewalls of the tank and all are actuated to provide a form of whirlpool turbulence for a predetermined period of time. Upon completion of the therapy session, the water is drained from the tank, the movable wall is unsealed and opened and the horse is removed.

These prior devices have not been found to be suitable and have not been utilized by horsemen because of certain inherent disadvantages, including the inordinate time required to fill the tank and to drain the tank for each horse undergoing therapy. Moreover, an insufficient number and inadequate placement of the whirlpool nozzles has not permitted sufficient flexibility to concentrate the therapeutic water agitation at the precise points of soreness.

SUMMARY OF THE INVENTION

These and other disadvantages of the prior therapeutic devices have been obviated by the present invention, which provides a true whirlpool bath for horses on a clean and sanitary basis in which a double-ramped channel shaped tube is filled with constantly circulated, filtered and heated water to the point that the horse can be immersed from the neck down. A plurality of air induction hydrojet nozzles is provided on opposing sidewalls of the tub and may be directed at the muscles in the horses's shoulders, back, hips and legs. The water fed through the nozzles is mixed with ambient air at the nozzle head to produce millions of tiny pulsating bubbles for gently massaging the horse's body. The whirlpool tub itself, may be constructed in sections of sturdy fiberglass and may be assembled on site in its channel shape with gentle entrance and exit ramps. The number and the location of the therapeutic jet nozzles is such that different portions of the horse may be subjected to therapeutic turbulence to meet particular diagnostic requirements in isolated portions of the body. The water in the tub is constantly cleaned and filtered thereby eliminating the need to drain the tub after each usage.

BRIEF DESCRIPTION OF THE DRAWINGS

For a further understanding of the present invention, reference may be had to the accompanying drawings, in which.

BRIEF DESCRIPTION OF THE PREFERRED EMBODIMENTS

Figure 1:
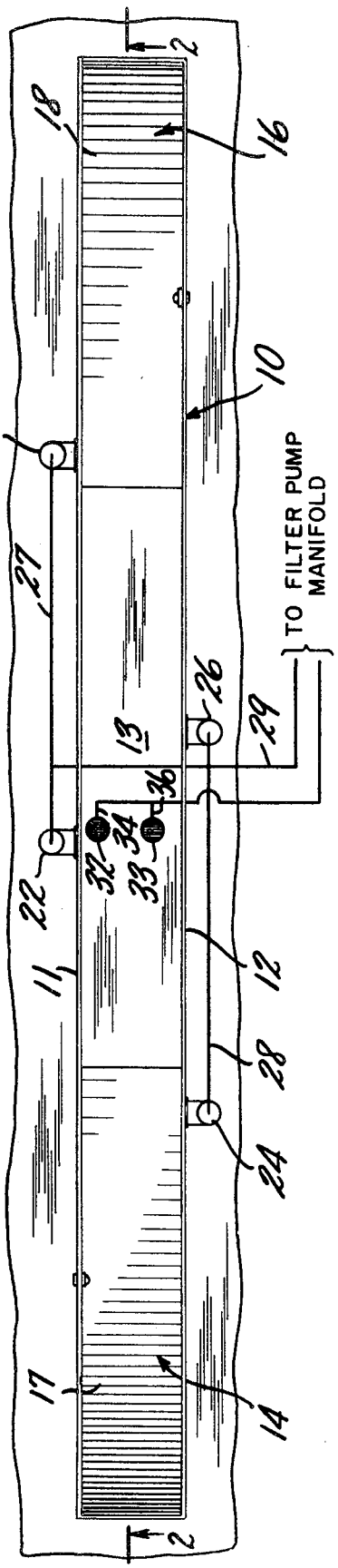
FIG. 1 is a top plan view of a whirlpool tub in accordance with the present invention.
Figure 2:
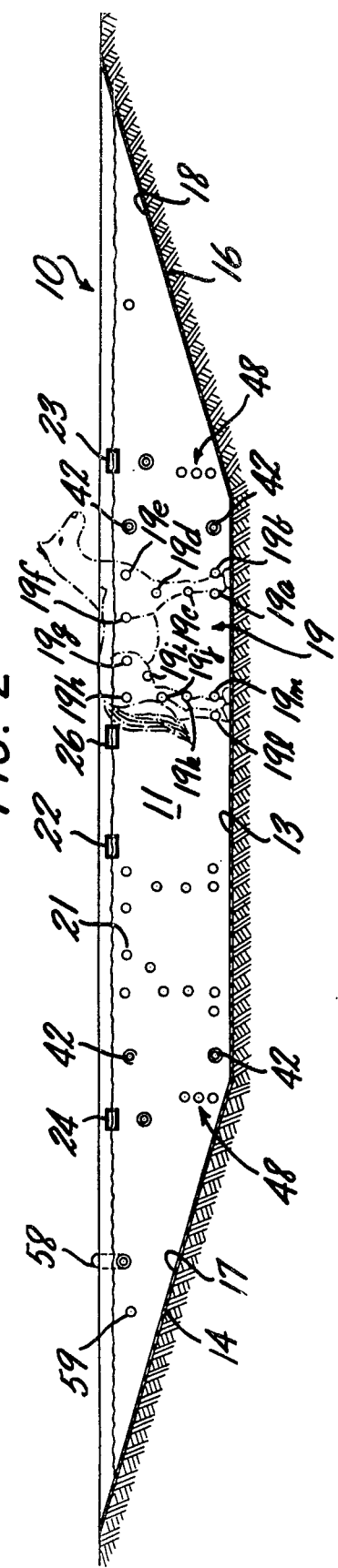
FIG. 2 is a view taken along the line 2—2 of FIG. 1.

Referring now to the drawings, and in particular to FIGS. 1 and 2, there is illustrated a channel-shaped structure 10 in which one or more horses may be immersed from approximately their backs down without requiring the horses to swim. The tub consists of a pair of elongated straight and parallel sidewall portions 11 and 12 spaced apart by a selected distance, preferably only slightly larger than the width of a horse. The width of the tub is determined so as to provide some freedom of movement of a horse within the tub, but not enough to enable the horse to turn around. The tub has a relatively flat horizontal bottom 13, preferably covered with a suitable rubberlike composition material to provide adequate footing.

The distance between the bottom 13 and the top of the sidewalls 11 and 12 is selected to enable an average water depth sufficient to reach at least slightly above the haunches of an average racehorse. This depth has been found empirically to be approximately five feet, and it enables adequate therapeutic treatment of the lower back and shoulder muscles of the horse. The sidewalls themselves may extend to any convenient height above the horse, although effective whirlpool therapy has been achieved with tubs in which the sidewalls extended to approximately 5½ feet above the bottom. At this height, persons located above the horse at the side of the tub can control the horses's head and thereby efficiently position and, if necessary, calm the horse during the therapeutic treatment.

Access for the horse to the center of the tub may be provided in several ways. In the present embodiment, a pair of ramp sections 14 and 16 project longitudinally away from the bottom 13 in opposite directions. The ramps are sloped conveniently, dropping about five feet over a linear distance of approximately eighteen feet, to enable horses to walk into and out of the tub. In this arrangement, one of the ramps, e.g. the ramp 14, is utilized for entrance of the horse to the bottom section of the tub and the other for exiting of the horse. The bottom of each of the ramps is preferably covered with a suitably soft rubberlike and ribbed material, 17 and 18 respectively, to ensure against the horse slipping and either being unduly frightened or otherwise injured during ingress to or egress from the tub.

In the preferred embodiment, the sidewalls 11 and 12 extend along the sides of each of the ramps 14 and 16. When the pool is full, the water level is shallow at the outer end of each of the ramps. Accordingly, the horses, upon entering or leaving the tub, walk into gradually deeper or shallower water, respectively.

The tub is preferably constructed of sturdy fiberglass, and may be either one molded piece or made of a plurality of fiberglass panels to be assembled and sealed together on site. The tub is intended to be installed in the ground as shown in FIG. 2, with the outer ends of the ramps being at approximately ground level. Where separate panels are used in the tub construction, each panel may be provided in advance or preassembled with the requisite inlet and outlet fittings and associated water and air induction piping, as described in detail below. Such modular type construction facilitates on site, in ground assembly and is preferred, although other construction techniques might be utilized without departing from the scope of the invention.

In accordance with the invention, the sidewalls of the tub adjacent the bottom section 13 are each provided with a plurality of hydrojet nozzles generally indicated by reference numerals 19 and 21 arranged in an inverted U pattern corresponding to the legs and sides of a horse, as shown in FIG. 2. The number and location of the jet nozzles for one side of a horse are shown in FIG. 2 against the phantom outline of a horse within the tub. It is to be understood that an identical arrangement of such nozzles is provided on the opposite sidewall for the other side of the horse. Accordingly, whirlpool therapy might, if necessary, be effected simultaneously on all four legs and on both sides of a horse properly situated in the tub.

It has been found that adequate whirlpool therapy for racehorses might be effected through the use of 13 such nozzles positioned on each side of the horse. With respect to the horse depicted in FIG. 2, and considering the nozzles shown in a counterclockwise direction, e.g. from bottom to top and from front to back of the horse, the nozzles are arranged as follows:

nozzles 19a and 19b side-by-side are provided for the shank, one nozzle 19c for the knee, and one nozzle 19d for the forearm and elbow area; a nozzle 19e is provided for the chest, one nozzle 19f for the shoulder, one nozzle 19g for the haunch and one nozzle 19h for the thigh area; with respect to the rear leg, one nozzle 19i is provided for the stifle, one nozzle 19j for the gaskin, one nozzle 19k for the hock and two nozzles 19l and 19m side-by-side for the fetlock and pastern portions of the leg.

Accordingly, each horse within the tub might be subjected to whirlpool turbulence provided by up to 26 nozzles when necessary or desirable. While the foregoing nozzle arrangement has been found to be particularly effective, the number or the specific location of such nozzles might be varied somewhat without departing from the scope of the invention. As described below the turbulence created by the nozzles may be directed either at the muscles in the horse's shoulders, back, hips and legs either simultaneously or separately, with particular concentration possible on joints which are thought to be especially sore or otherwise debilitated.

The tub 10 illustrated herein is designed to handle two horses simultaneously. In this arrangement, the horses are positioned tandem. The foregoing details concerning the hydrojet nozzles 19 surrounding the horse shown in phantom in FIG. 2 are identical for the other therapy site within the tub, around which hydrojet nozzles 21 are similarly positioned. Of course similar tubs may be constructed which are capable of treating two or more horses either in tandem or side-by-side without departing from the scope of this invention.

Figure 3:
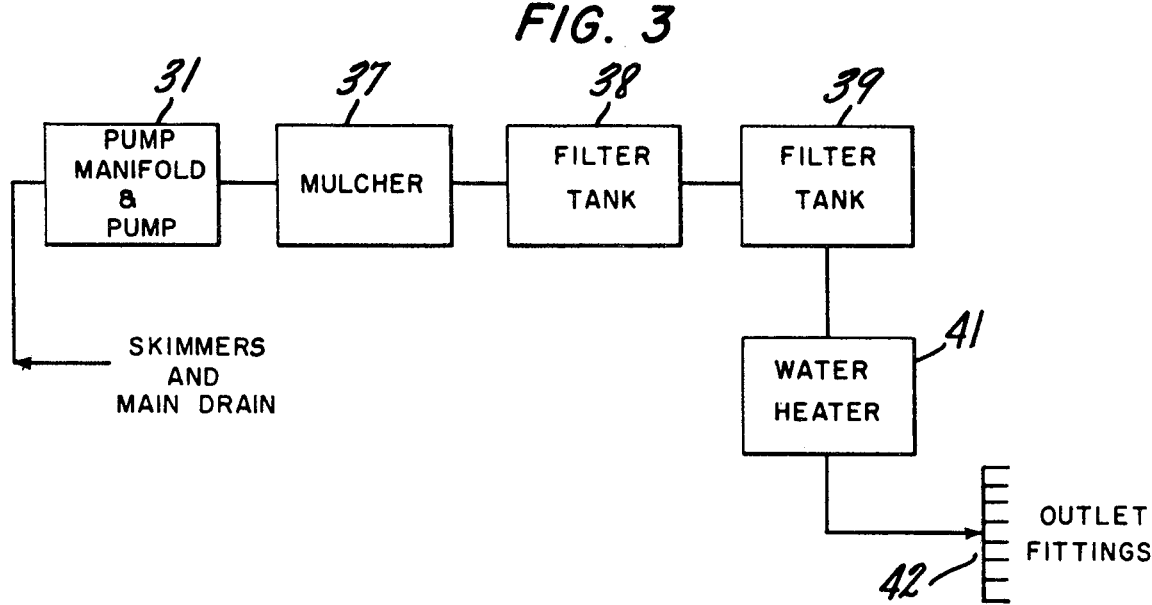
FIG. 3 is a schematic illustration of the water filtering system for a whirlpool tub of the present invention.

Each of the sidewalls of the tub is also provided with a plurality of preferably wide mouth skimmers 22–24 and 26 which act in a known way to clean the surface of the water of dirt, debris and other ingredients which would otherwise foul the water. In the preferred embodiment, the skimmers are arranged as shown in FIG. 1, with two relatively widely spaced skimmers 22 and 23 on one wall 11 and offset with respect to corresponding skimmers 24 and 26 on the opposite wall 12. The flow rate of the skimmers can be adjusted, as desired, between approximately five gallons per minute to as high as 50 gallons per minute. As shown in FIG. 1, each laterally aligned pair of skimmers is interconnected by a suitable drain pipe 27 and 28, respectively, preferably an inch and one half in diameter. These drain pipes are in turn connected to a main outflow pipe 29, approximately 3 inches in diameter, which runs to a filter pump manifold and pump 31, illustrated schematically in FIG. 3, and forming a part of the water recirculation system, described below.

One or more main drain outlets 32 and 33 may be provided, as desired, in the bottom 13 of the tub. In the two-bay embodiment illustrated herein, a pair of such drains each approximately 4¾ inches in diameter is provided, one for each horse, to facilitate water recirculation and filtering. Each of these drains is connected, respectively, to suitable drain pipes 34 and 36, illustrated schematically in FIG. 3, the output of which joins with that of the skimmer drain pipes 27 and 28 in the filter pump manifold 31. The pump 31 is of a known variety, capable of circulating the water at a rate which corresponds at least to the fluid handling capacity of the skimmers 22–24 and 26.

The output from the pump 31 passes to a debris mulching device 37, sometimes known as a centrifugal separator. A mulcher of this type is manufactured by Jacuzzi Brothers, Inc. and may be employed to remove heavy debris and excrement extracted from the water through the skimmers or main drains. The liquid output from the mulcher 37 passes through a series of filter tanks 38 and 39 of a known variety. One or more of such filter tanks may be utilized depending upon the requirements of the system and the number of horses which the tub is designed to hold for simultaneous therapeutic treatment. In the present embodiment, two such filter tanks are connected in series and serve to clean the circulating water of fine debris which was able to traverse the mulcher. From the filter tanks, the circulating water passes through a conventional water heater 41. The water heater may be gas or oil fired or operated electrically, depending upon the location of the whirlpool tub and the availability and expense of the requisite fuel. In some geographical locations hot water may be provided entirely or supplementally by conventional solar energy systems. The water heater 41 is designed to keep the temperature of the water entering the tub at approximately 100-110 degrees fahrenheit. This temperature has been found to be both comfortable and therapeutic for horses.

The output from the water heater is divided between each of a plurality of outlets 42 fitted into the sidewalls of the tub. In the present embodiment, each of the sidewalls 11 and 12 is provided with four such fittings, making a total of eight outlet fittings in the tub. The preferred location for the outlet orifices 42 along one sidewall 11 of the tub is illustrated in FIG. 2., it being understood that the remaining four outlets are identically positioned on the opposite sidewall 12. The outlets 42 are preferably located vertically one above the other and positioned so as to bracket the jet nozzles 19 and 21 between the two skimmers for each wall. Each outlet orifice is located approximately the same distance inwardly from the boundary of its respective sidewall and is positioned sufficiently away from nearby jet nozzles so as not to interfere with the turbulence generated thereby.

In accordance with the invention, water injected into the tub to create the therapeutic whirlpool turbulence is mixed at the nozzle head with air to produce millions of tiny pulsating bubbles for gently messaging the horse's body. Suitable air induction nozzles are manufactured by Jacuzzi Brothers, Inc. and are known as Hydro-Air water message inlet fittings. Such fittings are commonly employed in swimming pools and health spa whirlpool installations. In the present invention, these fittings are adjusted for deflection of the turbulence toward the requisite areas of the horse's body at the time of installation of the tub.

Figure 4:
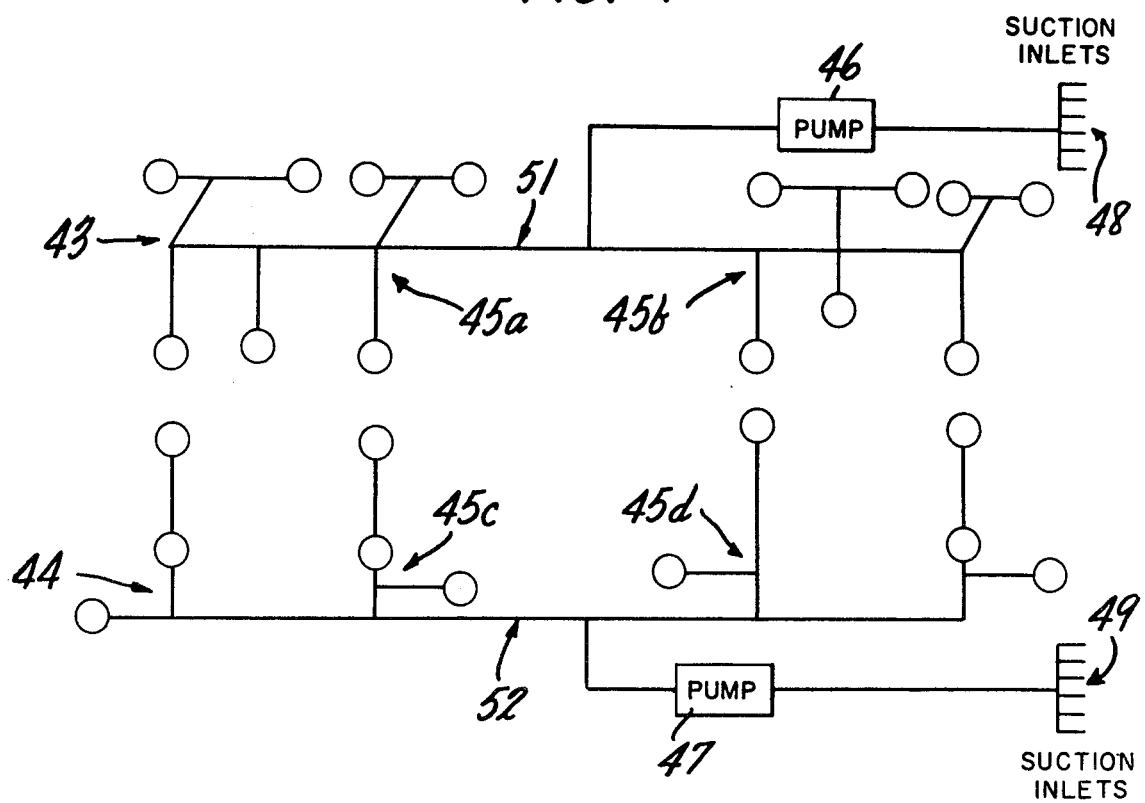
FIG. 4 is a schematic illustration of the water circulation system for the therapy jet nozzles of the present invention.

Referring now to FIG. 4, the piping arrangement for the supply of water to the hydroget nozzles is illustrated schematically. In this embodiment, the jet nozzles are grouped together into a pair of independently fed and controlled systems of upper and lower nozzles, generally indicated by reference numerals 43 and 44, respectively. The upper system 43 includes those nozzles situated to cover the upper body including the shoulders, thighs and haunches of the horse. The lower system 44 includes all those nozzles situated to direct the fluid turbulence at or below the level of the hock and knee of the horse.

Water pumps 46 and 47 are provided respectively for each of the foregoing nozzle systems 43 and 44. The pump 46 acts through a plurality of suction inlets 48, located for example in the sidewall 11 (FIG. 2), to extract water from one portion of the tub and to circulate it back into the tub through the upper system nozzles. Likewise, the pump 47 for the lower system 44 is connected to a plurality of similar suction inlets 49 also located in one of the sidewalls (sidewall 12) of the tub. In the present embodiment, each of the pumps is connected to six of these suction inlets, although the precise number can be varied as desired. Each of the pumps 46 and 47 is preferably a three horsepower pump, thereby to provide sufficient pressure for adequate therapeutic turbulence in the tub.

The location of the inlets 48 and 49 may be determined in accordance with the size and other design characteristics of a particular whirlpool tub. In the embodiment shown in FIGS. 1 and 2, for example, six of the inlets 48 are located respectively adjacent each of the entrance and exit ramps 14 and 16, substantially well below the surface of the water in the tub.

A manual or automatically operated valve element, a preferred location of which is indicated by reference numeral 51, may be provided in the upper system 43 to shut down the upper system nozzles for one of two horses receiving simultaneous therapy in the tub, as desired. A similar valve, the location of which is suggested by reference numeral 52, might be utilized in the lower nozzle system 44.

The foregoing arrangement advantageously enables efficient independent control over the location of therapeutic action of the tub. For example, a pair of horses might receive therapeutic treatment only for diagnosed soreness in the ankles. In this circumstance, the pump 46 in the upper system 43 is shut off while the pump 47 in the lower system 44 is actuated. Therapeutic turbulence is thereby directed only to the lower portion of the legs of each horse. Similarly, the pump 47 might be shut off while actuating the pump 46 in order to provide massage therapy only to the upper body portions of each horse.

Where valves such as the valves 51 and 52 are included in the system, additional flexibility in simultaneous two-bay massage therapy is achieved. For example, one horse might receive the full range of upper and lower therapeutic treatment while the other horse receives massage treatment covering only an upper or lower body portion.

Alternatively, each of the opposing networks of nozzles 43 and 44 covering two horses in the present two-bay tub, might be operationally subdivided into a pair of distinct and separately actuated nozzle arrays interconnected in parallel, for example, arrays 45a and 45b with respect to the upper network 43, and arrays 45c and 45d with respect to the lower network 44. Thus the upper arrays 45a and 45b for each horse as shown in FIG. 2, could be separately actuated, as well as each of the corresponding lower arrays 45c and 45d. With appropriate valve control over the output from each of the pumps 46 and 47 in the resulting circulatory systems, either or both of the upper and lower nozzle arrays provided for one horse might then be utilized to meet a particular therapy requirement independently of the requirements for the other horse in the tub. In a further modification of the water circulation networks shown in FIGS. 2 and 3, each separate hydrojet nozzle might be provided with an automatically controlled shut-off valve (not shown) to provide even more flexibility in the selection of specific therapy treatments.

Figure 5:
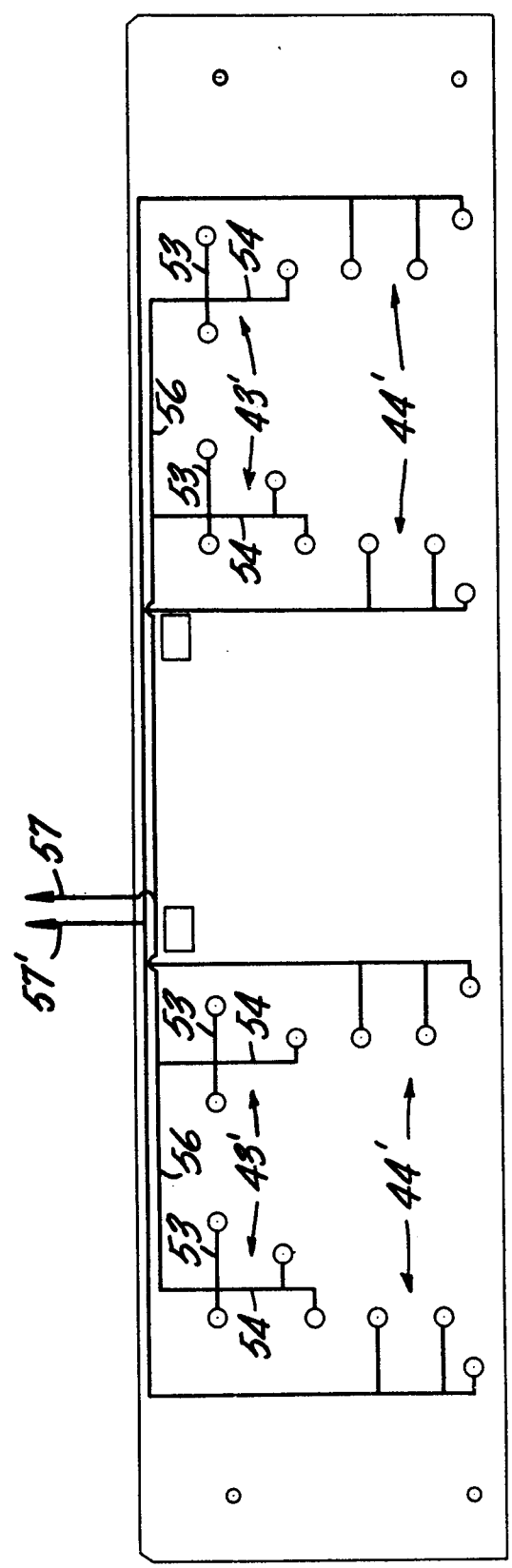
FIG. 5 is a schematic illustration of the air induction system for the therapy jet nozzles of the present invention.

Referring now to FIG. 5, there is shown in schematic form the air induction layout for the hydrojet nozzles. For this system, the arrays of jet nozzles are operationally subdivided and grouped together into upper and lower networks 43' and 44' corresponding respectively to circulation networks 43 and 44 shown in FIG. 4. With respect to the nozzle array 43', each individual nozzle is connected by way of an air induction conduit 53 approximately ½ inch diameter to a larger common conduit 54 of approximately one inch diameter. Each of the one inch conduits is in turn connected to a main conduit 56 of approximately 1½ inches diameter having a suitable vent pipe 57 of approximately two inches diameter and which is opened to the atmosphere. Identical conduits and venting are provided for the nozzles which define the corresponding network 44'. In this embodiment, only one vent pipe 57 and 57' is provided respectively for each of the networks 43' and 44', although additional vents may be provided if necessary or desirable. The hydrojet nozzles operate in a known manner to entrain air at atmospheric pressure through means of an internal venturi (not shown), thereby to provide the desired mixture of air and water at the nozzle outlet. Nozzles which are capable of providing a mixture of air and water at the outlet may be purchased from Jacuzzi Brothers, Inc. as described above. The vent pipes 57 and 57' may be brought to the atmosphere adjacent the tub 10 or to any other equally suitable location. It is to be understood that the hydrojet nozzles need not be subdivided or grouped into the same operational networks as set forth herein with respect to the illustration in FIG. 5, and that other suitable combinations may be utilized to meet varying requirements of the system without departing from the scope of the invention.

The tub 10 may be provided with a suitable water level sensor 58 which functions in a known manner to signal for additional water when the water level in the tub drops to a predetermined point by way of evaporation or other common events resulting in water depletion under normal operating circumstances. A water temperature sensor 59 may also be included in the tub as a safety to control the water heater and thereby to maintain the temperature at a suitable and comfortable level for proper therapeutic treatment.

It will be understood that whirlpool therapeutic tubs or pools according to the present invention are susceptible of various modifications, changes and adaptations as will occur to those skilled in the art. It is, therefore, intended that the scope of the present invention is not to be limited except as defined by the following claims.

What is claimed is:

1. A whirlpool therapy facility for applying water turbulence massage to selected portions of the body of a horse, comprising:
    a channel shaped tub for containing a pool of water and having a substantially flat horizontal bottom positioned between a pair of opposed upstanding wall members;
    a plurality of output nozzles carried by each of the wall members and opening into the pool, the nozzles being arranged in an inverted substantially U-shaped pattern on each of the wall members and arranged to correspond approximately to the relative positions of the legs and torso of a horse standing on the bottom, including at least one separate nozzle on each wall positioned to direct a water turbulence massage at each of the following areas of the horse: the shank, the knee, the forearm and elbow area, the chest, the shoulder, the haunch, the thigh, and with respect to the rear leg, the stifle, the gaskin, the hock, and the fetlock and pastern portions;
    means for injecting water into the pool under pressure through selected ones of said nozzles, thereby to provide turbulence in the pool for massaging portions of the body of a horse situated in the tub between the wall members; and
    means for treating the water contained by the tub to extract debris and other foreign matters therefrom, in which said water treatment means comprises:
    a plurality of suction type skimmers carried by the wall members at the surface of the water;
    at least one drain carried by the bottom of the tub;
    a pump in fluid flow communication with the drain and said skimmers to extract water from the tub;
    a plurality of filtering elements through which water is forced by said pump; and
    a plurality of outlet openings carried by the wall members by which water enters the tub after passage through said filtering elements.

2. The facility of claim 1 comprising means for heating water to a predetermined temperature after passage through said filtering elements and prior to its entry into the pool.

3. A whirlpool therapy facility for applying water turbulence massage to selected portions of the body of a horse, comprising:
    a channel shaped tub for containing a pool of water and having a substantially flat horizontal bottom positioned between a pair of opposed upstanding wall members;
    a plurality of output nozzles carried by each of the wall members and opening into the pool, the nozzles being arranged in an inverted substantially U-shaped pattern on each of the wall members and arranged to correspond approximately to the relative positions of the legs and torso of a horse standing on the bottom, including at least one separate nozzle on each wall positioned to direct a water turbulence massage at each of the following areas of the horse: the shank, the knee, the forearm and elbow area, the chest, the shoulder, the haunch, the thigh, and with respect to the rear leg, the stifle, the gaskin, the hock, and the fetlock and pastern portions;
    means for injecting water into the pool under pressure through selected ones of said nozzles, thereby to provide turbulence in the pool for massaging portions of the body of a horse situated in the tub between the wall members, in which said water injecting means comprises:
    a first set of intake openings carried by the wall members in fluid flow communication with a first set of said output nozzles;
    a second set of intake openings in the wall members of the tub in fluid flow communication with a second set of said output nozzles; and
    means for drawing water from the pool through each of said sets of intake openings and selectively forcing such water into the pool under pressure through either of said first and second sets of output nozzles.

* * * * *